INVENTOR
Paul E. Breneman
Joseph H. Bourqon
BY
ATTORNEY

May 14, 1929.   P. E. BRENEMAN ET AL   1,712,547
BODY CONSTRUCTION
Filed May 21, 1926   5 Sheets-Sheet 2

INVENTORS
Paul E. Breneman
Joseph H. Bourgon
BY
ATTORNEY

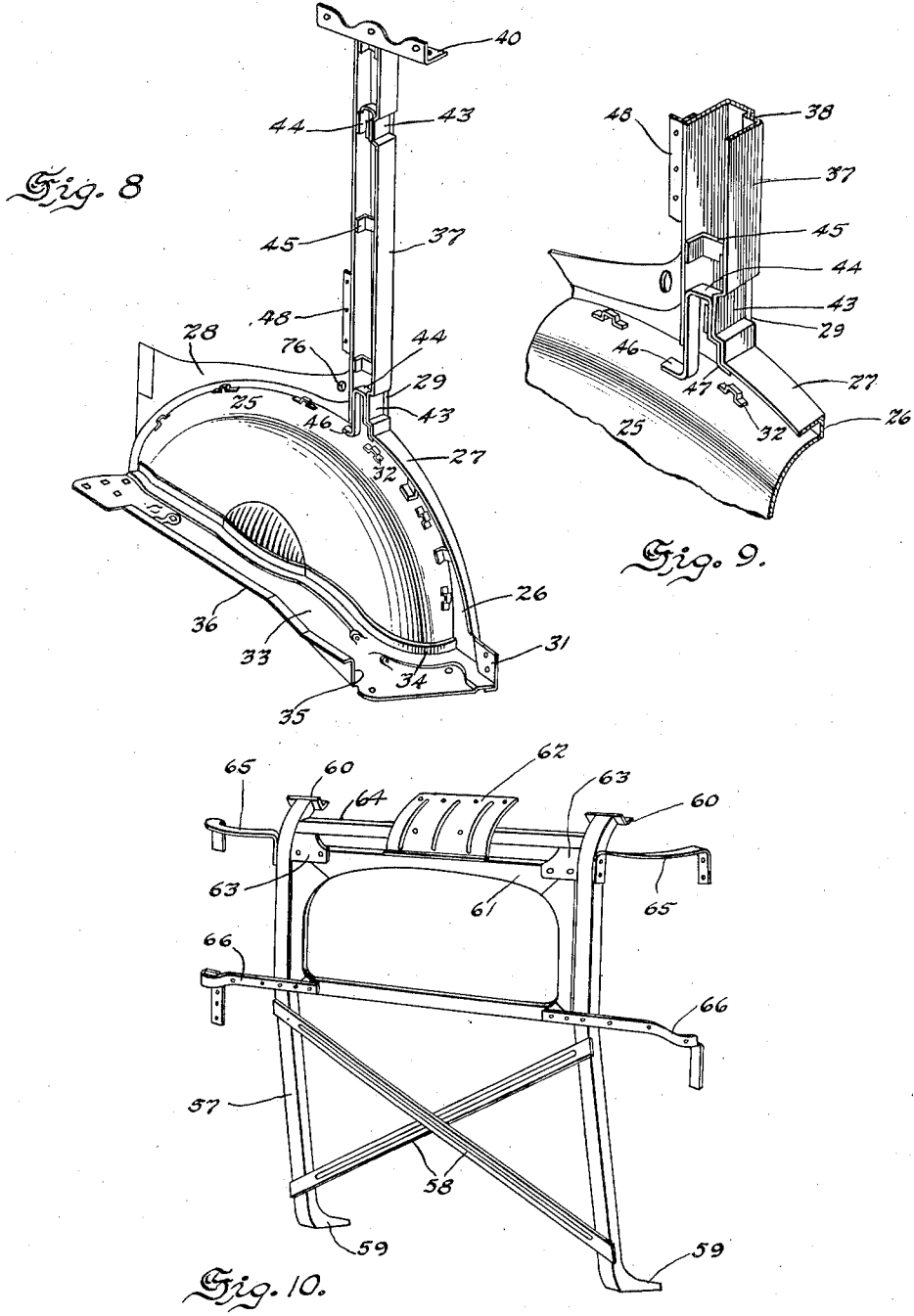

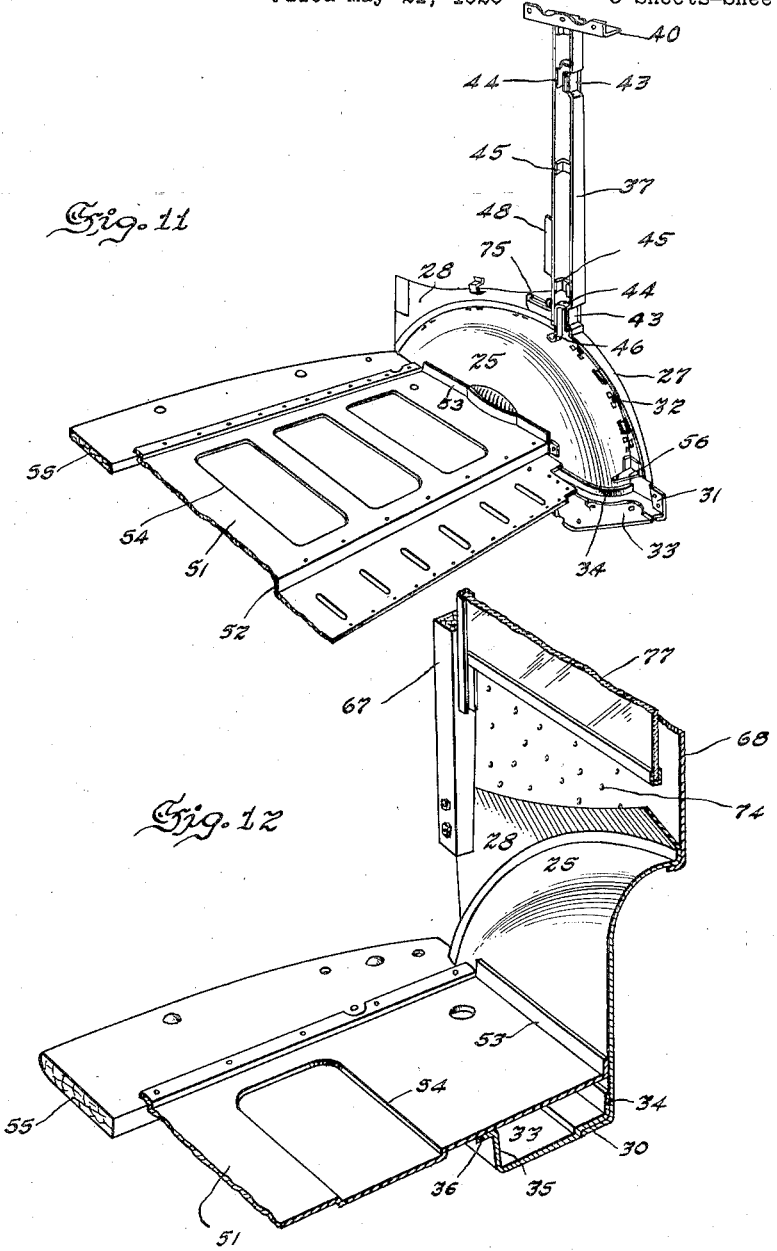

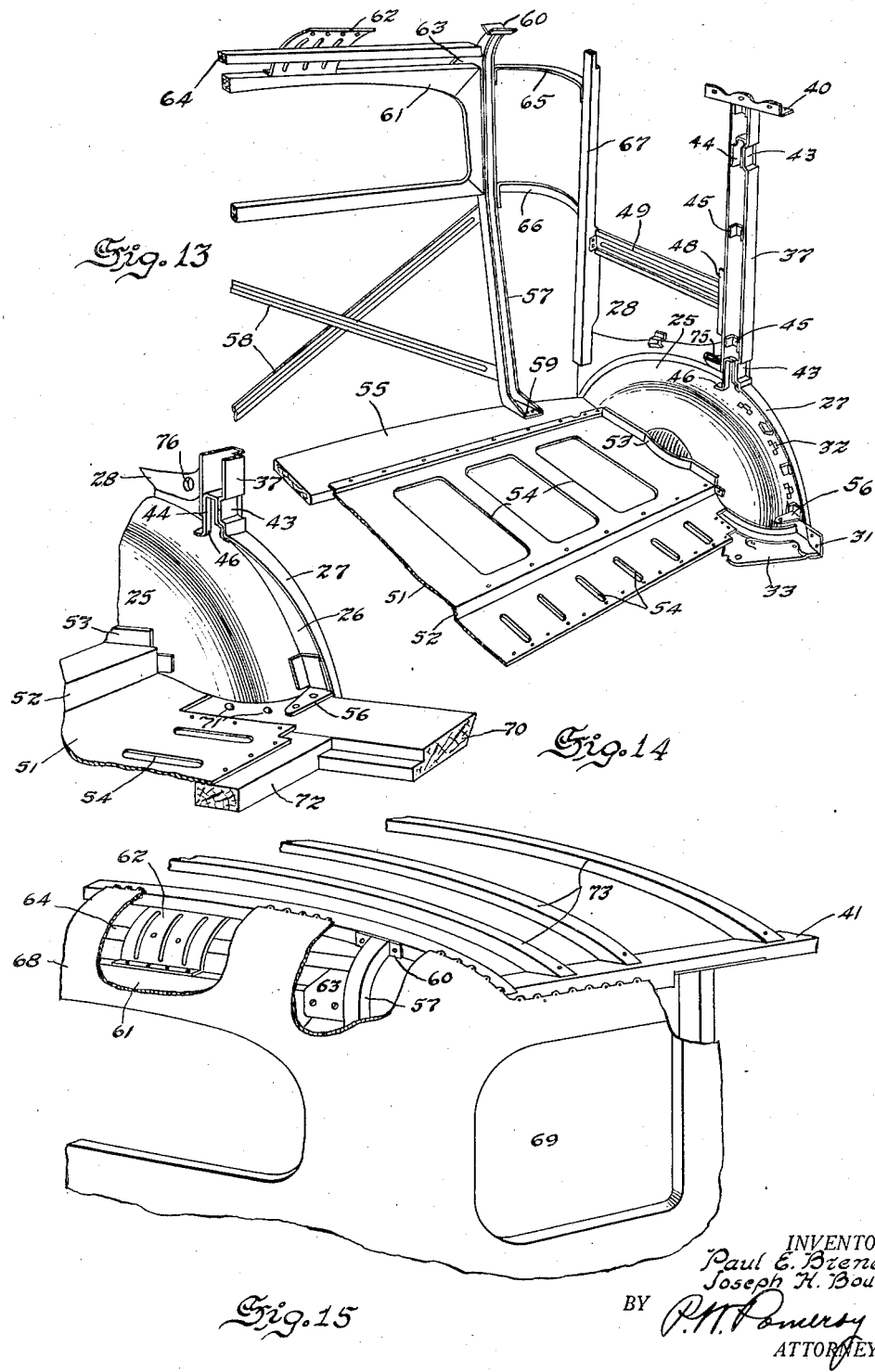

Patented May 14, 1929.

1,712,547

UNITED STATES PATENT OFFICE.

PAUL E. BRENEMAN AND JOSEPH H. BOURGON, OF DETROIT, MICHIGAN, ASSIGNORS TO THE STUDEBAKER CORPORATION, OF SOUTH BEND, INDIANA, A CORPORATION OF NEW JERSEY.

BODY CONSTRUCTION.

Application filed May 21, 1926. Serial No. 110,692.

This invention relates to automobile bodies, and particularly to the rear section therefor, the principal object being to provide such a section fabricated for the most part from sheet metal, whereby the same will be strong, relatively light, and when produced in quantities, economical to manufacture.

Another object is to provide a rear section for an automobile body in which the door pillars are formed from sheet metal and are secured thereto to form an integral part thereof.

Another object is to provide a rear section for an automobile body which may be completely finished and, with other similarly finished parts, be secured to a sill and roof to make up a complete body without necessitating further finishing.

Another object is to build up a rear section for an automobile body as a unit and capable of being assembled into an automobile body as such, a portion of the section being formed in such a manner that when secured to the body sills it effects a continuation thereof.

Another object is to provide a sheet metal wheel housing separately from the panel and to which the panel is adapted to be secured to form an integral unit, the wheel housing being adapted to form a continuation of a door pillar preferably integrally secured thereto.

Another object is to provide a sheet metal wheel housing and a sheet metal seat pan, the seat pan being integrally secured to said wheel housing, and a separate sheet metal member secured to both the wheel housing and seat pan to form a hollow structure simulating a sill member and effecting a continuation of a body sill.

Another object is to provide a sheet metal wheel housing having an inturned upper marginal edge, and a body panel secured to the wheel house whereby a drip trough is formed between the said inturned edge and the panel for receiving and carrying away water entering a window there-above.

A further object is to provide a body rear section capable of being completely finished as a unit separately from the body sills and roof, and provided with flange means for thereafter securing said sills and roof thereto.

The above being among the objects of the present invention, the same consists of certain features of construction and combinations of parts to be hereinafter described with reference to the accompanying drawings, and then claimed, having the above and other objects in view.

In the accompanying drawings which show a suitable embodiment of the present invention, and in which like numerals refer to like parts throughout the several different views—

Fig. 8 is a perspective view of the wheel housing of Fig. 3, the plate of Fig. 4 and the pillar of Fig. 5 integrally secured together in properly assembled position.

Fig. 9 is an enlarged perspective view showing the manner in which the door pillar is secured to the wheel housing.

Fig. 10 is a perspective view of the framework assembly which as a unit is adapted to be secured to the wheel housing.

Fig. 11 is a perspective view of the unit of Fig. 8 to which the seat pan and rear cross member has been secured.

Fig. 12 is a sectional perspective view taken substantially in the plane of the lines 12—12 of Fig. 2, illustrating the drip trough formed by the upper edge of the wheel house and panel, and showing the relative position of a window therewith to indicate how water entering the window opening and dripping off the window is collected and carried away.

Fig. 13 is a perspective view showing the wheel housing and seat pan unit as illustrated in Fig. 11, assembled to the frame unit as illustrated in Fig. 10, together with certain other parts necessary to complete the framework to a point where it is ready to receive the panel.

Fig. 14 is a fragmentary perspective view showing the manner of securing the completed section to the body sill.

Fig. 15 is a fragmentary partially broken perspective view showing the manner in which the roof frame is secured to the completed rear section.

In the conventional method of manufacturing automobile bodies, particularly those of the so-called closed type, a frame work for the complete body, excepting, of course, the doors, and including the roof frame, is built up on the sills to the shape of the completed body, and is then covered by suitable metal panels and roof covering and thereafter painted, trimmed and otherwise finished. Accordingly the pillars are formed as part of the framework and the metal of the panels is extended around them, not as a means of imparting strength thereto, but merely as a finishing covering. Inasmuch as such constructions are built by first forming the framework for the complete body on the sills, and later covering the same, it results that the body must be worked on as a single unit during assembly. Also, in the conventional method of construction, the body sills extend to the extreme rear end of the body and part of the framework is built up thereon and supported thereby.

The present invention contemplates an entirely different method of construction whereby the major portions of the body are built up separately to nearly finished condition as separate sections, and thereafter assembled together to provide the completed body. Such a method necessitates elimination of the building up of a framework on the sills, and makes it necessary to include any such framework that may be employed as an integral part of each unit.

Figure 1:
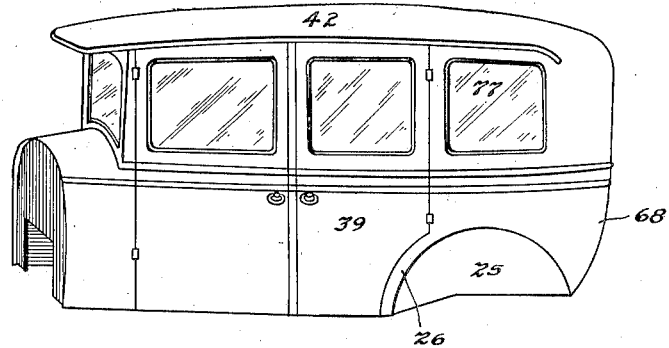
Fig. 1 is a perspective view of a completed automobile body incorporating a rear body section built in accordance with the present invention.
Figure 2:
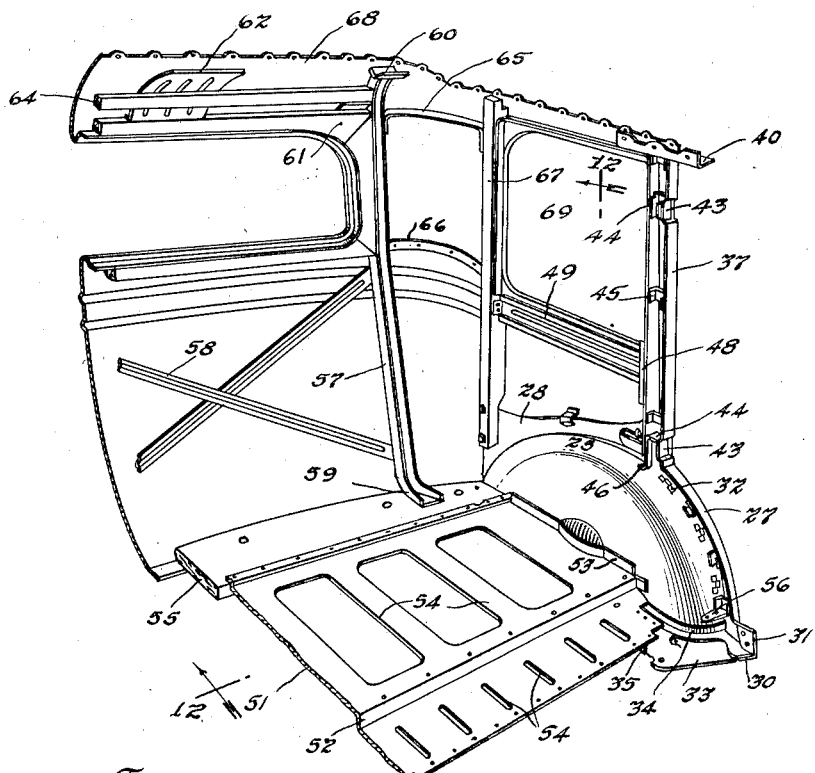
Fig. 2 is a broken perspective view of the rear section at a stage of completion in which it may be assembled to the roof and sills and the rest of the body of which it is to form a part.

In accordance therewith, a rear body section is shown in the accompanying drawings, embodying the present invention. The rear section, a broken perspective view of which is shown in Fig. 2 in a state of completion such that it may be assembled to the sills and roof, comprises all of that portion of the body rearwardly of the rear door with the exception of the corresponding portion of the roof. The section shown may, if desired, be brought to a further stage of completion than shown by trimming the same, inserting the windows, window regulator, etc., and, of course, as previously described, bringing the outside of the section to a finished painted condition if desired, before assembly to the remaining sections and parts to form a completed body.

The method shown in the drawings of building up this section is to first build up two unit assemblies, forming two main parts thereof, securing such units together with necessary additional members to form a complete frame unit, and thereafter applying the panel and finishing the same. The two units referred to are what will be called in the following description the wheel house unit and the frame unit, and for the sake of clearness of description, in the drawings and description of the section and of these parts, they will be shown and described, in the main, as being for one half of the body, it being understood that that portion for the opposite side of the body is of exactly the same construction except that some parts thereof are necessarily reversed to conform to the opposite side of the body.

Figure 3:
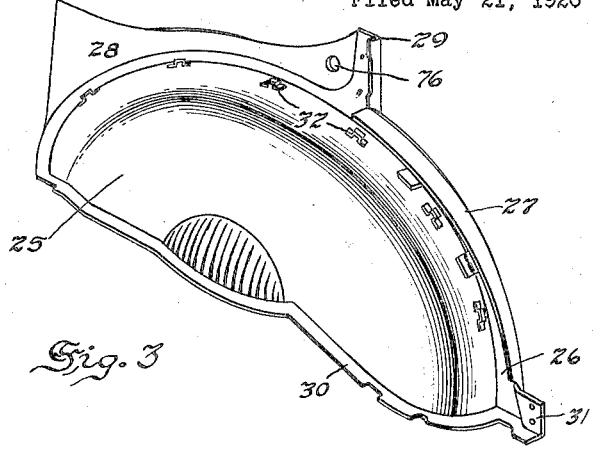
Fig. 3 is a perspective view of the wheel housing.

Referring first to the wheel house unit one-half of which is shown in perspective in Fig. 11, the construction of the same and the method of building it up will be explained. The construction is started with the wheel house 25 which is shown alone in perspective in Fig. 3, the view being taken from the inside. As shown, the wheel house is formed from sheet metal to present, from the exterior of the body, an inwardly extending depression which provides clearance for one of the rear wheels in respect to the body, the main portion of the metal being so shaped as to extend inwardly perpendicular to the side surface of the body and gradually turn into a plane parallel to such surface. As shown in Fig. 3, the forward edge of the metal of the wheel house 25 is turned into a plane parallel to the side surface of the body for a short distance as at 26, and is then turned inwardly as at 27, thus forming a channel sectioned edge which, as will later be apparent, forms, in effect, a portion of the rear door pillar, the last two mentioned surfaces 26 and 27 acting as an exterior and finished part of the body 26. The metal at the upper edge of the wheel house 25 is brought up into an extended marginal flange 28, the front end thereof terminating in a vertical angular flange 29 immediately adjacent the rear end of the surface 27, and the portion between the ends is bent inwardly at an acute angle to the outer surface of the body for a purpose to be described later. The lower edge of the wheel house 25 is bent inwardly to form a marginal horizontal flange 30, and the lower forward edge of the surface 27 is turned into a vertical plane to form an attaching flange 31. Nut members such as 32 are secured to the inside of the inwardly extending portion of the wheel house 25 over openings in the same, for the purpose of receiving screws (not shown) which are passed up therethrough from beneath in order to secure the rear fenders (not shown) to the body.

A plate member 33, which will be hereinafter designated as the bottom plate 33, lies mainly in a substantially horizontal plane and is provided with a stepped outer edge terminating in an upwardly extending marginal flange 34, the inner edge being turned upwardly for the greater part of its length to form the wall 35 which terminates in the inwardly extending marginal flange 36. The bottom plate 33 is of substantially the same length as the wheel house 25 and is secured thereto by placing its outer marginal flange 34, which is shaped to the same contour as the lower edge of the wheel house 25, against the lower edge of the wheel house 25 with the lower flange 30 of the wheel house 25 received against the lower face of the stepped outer edge of the bottom plate 33, and welding or otherwise securing the flanges 34 and 30 to the surface against which they contact. The relation of the parts in such secured position is best illustrated in Fig. 12.

Figure 5:
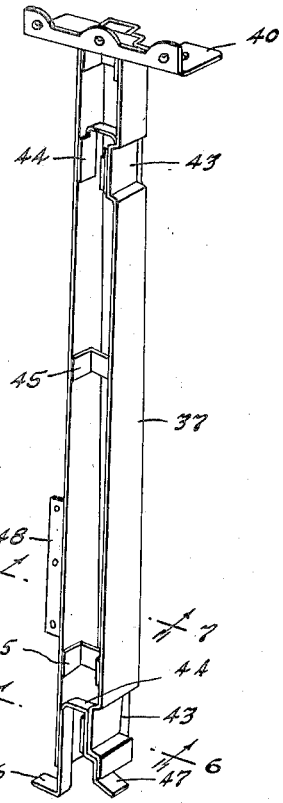
Fig. 5 is a perspective view of one of the completed door pillars ready to be secured to the wheel housing.
Figure 4:
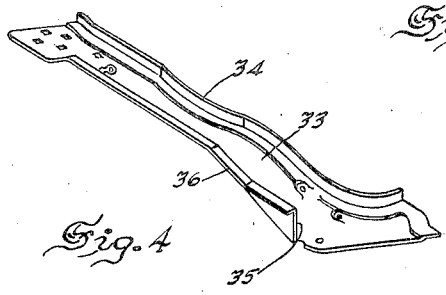
Fig. 4 is a perspective view of the plate which is adapted to be secured to the wheel housing and seat pan to form in combination therewith and provide a hollow structure effecting a continuation of the body sill.
Figures 6, 7:
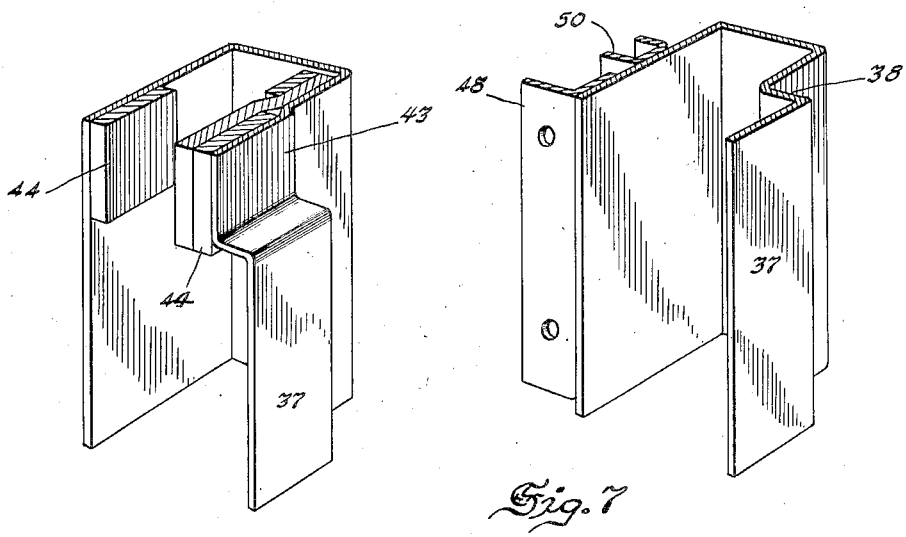
Fig. 6 is a perspective sectional view of the door pillar taken on the line 6—6 of Fig. 5.
Fig. 7 is a perspective sectional view of the door pillar taken on the line 7—7 of Fig. 5.

The door pillar, which is next secured to the wheel house 25, is shown alone in perspective, as viewed from the inside in Fig. 5. It comprises a main body portion 37 of channel shaped formation, the forward face of which is provided with a step 38 (Fig. 7) to match the stepped edge of the door 39 which is adapted to co-operate therewith. It is provided with an elongated L-shaped flange 40 at its upper end for receiving and supporting the rails 41 of the body roof 42. Depressions 43 are formed in its forward face to provide seats for the door hinges which are secured therein, suitable U-shaped reinforcements 44 being provided between the forward and rear walls of the channel at the location of such depresssions 43 to strengthen the pillar at this point, and other U-shaped reinforcements 45 are provided intermediate the same for a similar purpose. The legs of the lower reinforcement 44 are extended down past the lower end of the body portion 37 and are bent forwardly and rearwardly to provide horizontally disposed attaching flanges 46 and 47. An angle shaped vertically disposed member 48 is secured to the rear face of the body portion 37 to provide a support for the window regulator board 49 which extends rearwardly therefrom, and if desired a window glass channel or channel support 50 (Fig. 7) may also be secured to such face. The pillar is secured to the wheel house 25 by placing the lower end of the same within the angular flange 29 in abutting relationship on both sides thereof, and with the flange 46 resting against the inwardly extending portion of the wheel-house 25 and the flange 47 abutting against the under face of the inturned portion 27 as best illustrated in Fig. 9, and then welding or otherwise securing the abutting surfaces together, thereby causing the pillar to become an integral part of the wheel-house 25, and forming a unit as shown in Fig. 8.

The unit as illustrated in Fig. 8, and a corresponding one for the opposite side, are then joined together by the seat pan 51 which is made from a single sheet of metal and formed to provide a step 52, upturned marginal flanges 53 being provided at its ends and various depressions such as 54 being provided to impart stiffness thereto. The pan 51 is secured to the wheel-house 25 by resting its lower surface on the flange 36 of the bottom plate 33 and bringing the flange 53 into contact with the wheel-house 25 in which position it is welded or otherwise secured thereto, and the flange 36 of the plate 33 is also welded or otherwise secured to the pan 51. The resulting joint, as best illustrated in Fig. 12, forms a hollow structure which serves as a sill for the rear section of the body, independent of the body sill itself. As a means for further stiffening the unit thus built up, and as shown in Fig. 11, a rear cross-member 55, extending between the rear ends of the wheel-house units, is secured thereto and supports the rear edge of the seat pan 51 which is also secured thereto. An attaching flange member 56 is secured within the channel formed by the wheel-house 25, and faces 26 and 27, thus serving to reinforce the same, and is provided with an inwardly projecting portion lying parallel and spaced from the forward horizontal end of the bottom plate 33 for a purpose to be presently described. The unit thus completed and as shown in Fig. 11 is now ready to be assembled to the frame unit which will now be described.

The frame unit which is shown alone in completed condition in Fig. 10, comprises main vertically extending sheet metal members 57 secured together in spaced relation by crossed sheet metal tie members 58 which are welded or otherwise secured thereto. The lower ends of the members 57 are forwardly bent to form attaching feet or flanges 59 and the upper ends are provided with angle flanges 60 secured thereto. A window opening frame 61 extends between the members 57 adjacent the upper ends thereof and is secured thereto, a supporting bracket member 62 being supported and secured to the upper edge thereof for a purpose to be later described. Sheet metal brackets 63 welded or otherwise secured to the members 57 serve to secure the upper corners of the frame 61 to the members 57 and are provided with an upwardly extending portion to which the trim stick 64, which extends between the members 57, is secured. The trim stick 64 is further supported at its center by being fastened to the bracket member 62. Strap iron corner members 65 secured to the members 57 adjacent the upper edge of the window frame 61 extend outwardly and forwardly therefrom, and similar members 66 are secured to the members 57 adjacent the lower edge of the window frame 61, except that the inner ends of the members 66 project inwardly past the inner edges of the members 57 and are secured to the window frame 61 and thereby help to support the same.

The frame unit, as shown in Fig. 10, is then secured to the wheelhouse unit, as shown in Fig. 11, in the manner illustrated in Fig. 13. More specifically the feet 59 of the members 57 are bolted or otherwise secured to the rear cross-member 55, a post member 67 is bolted or otherwise secured in upright position to the rear edge of the flange 28 on the wheel-house 25, the forwardly projecting ends of the strap 65 and 66 are secured to the post 67, and a plate 49, which may also serve as means for supporting a window regulator (not shown), extends between and is secured to the post 67 and the flange 48 on the pillar main member 37. The frame unit and wheelhouse unit are thereby rigidly secured together and are ready to receive the sheet metal covering or panel 68. The panel 68 is preferably an integral sheet of metal formed to fit the frame in a conventional manner, its lower edge being bent inwardly to form a marginal flange 69 which is secured to the lower face of the rear cross member 55 across the back of the body, and to the inwardly extending curved portion of the wheel-house 25 on the sides of the body as shown in Fig. 2. The forward edges are turned in and are secured to the outer of the forward edge faces of the pillar main members 37 by welding or other suitable means. The metal adjacent the rear window opening frame 61 is punched out and the edges are turned in and secured to the frame 61, and other window openings 69 are formed in the sides thereof. The metal at the upper edge of the panel 68 is formed in small scallops and perforated to receive nails or screws.

The section thus completed, as described above and as shown in Fig. 2, may be secured to the other sections or parts of the body in that condition to make up the complete body, but it is preferably brought to a more finished state of completion before this step. It may be painted, including the final coat where found practical, and the interior thereof may be partially trimmed, the windows and window regulators, and other fittings added before securing it to the remaining sections.

In the particular construction shown and described, the body sills proper 70 extend only up to the wheel-house 25, see Fig. 14. The rear ends of the sills 70 are formed to match the forward end of the wheel house 25 and are placed in abutting relationship therewith with their lower surfaces resting against the upper face of the forward end of the bottom plate 33, the forward corners of the seat pan 51 and the flanges 56 overlying the upper surface thereof, and the sills 70 are then secured to these flanges and surfaces by bolts such as 71 or by other suitable means. The forward edge of the seat pan is supported by and secured to a sill rear cross member 72 as shown in Fig. 14. The other sections having been likewise secured to the sills 70, the roof frame is then applied as shown in Fig. 15. The roof frame comprises longitudinally extending rails 41 secured together in spaced relation by cross-bows 73. It is secured to the rear section by resting the rails 41 against the pillar flanges 40 and by seating the rear cross bow 73 against the flanges 60 on the upper end of the frame members 57, in which position the rails 41 and rear cross bow 73 are secured to such flanges by screws or other suitable means. The posts 67 are then secured to the rails 41 and the rear flange member is secured to the under side of the rear cross-bow 73, after which the upper marginal edges of the panel 68 are fastened along its length to the rails 41 and rear cross-bow 73 as shown in Fig. 2. The roof frame is then in condition to be covered by suitable material and the section finally trimmed and otherwise finished.

It is to be noted that when the panel 68 is applied as described, a trough 74 is formed between it and the inwardly bent flange 28 at the upper edge of the wheel house 25 as best shown in Fig. 2. This is for the purpose of catching any rain or other water that may enter the body through the window opening 69 and run down and drip off of the lower edge of the window 77.

An opening (not shown) leads from the trough 74 to a point below the body to allow such water to be discharged outside of the body. To compensate for the narrowness of the trough at the forward end thereof where the metal is bent to a vertical plane in order to pass outside of the pillar 37, a sheet metal cup 75 is secured to the inner face of the flange 28 adjacent the pillar 37, and an opening 76 connects the interior thereof with the interior of the trough 74 so as to allow water to pass from one to the other.

From the foregoing description, the construction and method of assembly should be readily understood and it is apparent that formal changes may be made in the specific embodiment of the invention described without departing from the spirit and substance of the broad invention, the scope of which is commensurate with the appended claims.

What we claim is:—

1. A rear section for an automobile body comprising wheel housings integrally secured together by a seat pan and provided with integral door pillars, a member extending between said wheel housings and secured to said seat pan, a framework supported by and secured to said member, posts supported by said wheel house connected to said frame and to said pillars, and a covering for said section, said section being adapted to be brought to a substantially finished condition before being secured to the pillars and roof of said body.

2. In an automobile body, a sheet metal wheel house provided with an inwardly and then upwardly extending portion secured to the lower edge thereof, and a sheet metal seat pan secured to said upwardly extending portion and to said wheel house whereby to form a hollow structure effecting a continuation of a body sill, and means for socketing a body sill within said hollow structure.

3. In an automobile body construction, a sheet metal wheel house the upper edge of which is formed to provide a vertical angular attaching flange and a sheet metal door pillar integrally secured to said flange, the upper edge of said wheel house forwardly of said pillar being bent into channel shaped formation to effect a continuation of said pillar to the bottom surface of said body, and the upper edge rearwardly of said pillar being formed to provide with the body sheathing a water receiving trough.

4. In an automobile body construction, a sheet metal wheel house comprising a main inwardly and then downwardly extending portion provided with an extending marginal portion along its upper edge, a portion of said edge between its ends being formed to provide an angular attaching flange, and said edge forwardly of said flange being formed into an inwardly opening channel section and a sheet metal door pillar integrally secured to said flange and provided with a downwardly projecting reinforcing member terminating in feet secured to said inwardly extending portion and to said channel shaped edge.

5. In an automobile body construction, a sheet metal wheel house provided with an upwardly and inwardly extending marginal edge forming a trough between the same and the adjacent body panel.

6. In an automobile, a sheet metal wheel house and a body panel secured thereto, the upper edge of the wheel house being bent inwardly to form a trough between the same and said panel.

7. In an automobile body construction, a sheet metal wheel house provided with an upwardly extending marginal flange inwardly bent at an angle to the body panel between its ends to form a trough, the ends of said flange being disposed in a vertical plane and forming supports, and a cup secured to one end of said flange and communicating with said trough whereby to supplement the same.

8. In an automobile body construction, a sheet metal wheel house provided with an upwardly extending upper marginal flange, a body panel secured to the lower edge of said flange, and a window opening in said panel above said wheel house, said flange between its ends being bent inwardly at an angle to said panel whereby to form a trough to catch and carry away any water entering the body through said opening in said panel.

Signed by us at Detroit, Michigan, U. S. A., this 12 day of May, 1926.

PAUL E. BRENEMAN.
JOSEPH H. BOURGON.